US010133060B2

(12) United States Patent
Oikawa

(10) Patent No.: US 10,133,060 B2
(45) Date of Patent: Nov. 20, 2018

(54) ELECTRO-OPTICAL DEVICE AND ELECTRONIC DEVICE

(71) Applicant: SEIKO EPSON CORPORATION, Tokyo (JP)

(72) Inventor: Hiroyuki Oikawa, Sakata (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/584,823

(22) Filed: May 2, 2017

(65) Prior Publication Data

US 2017/0336623 A1 Nov. 23, 2017

(30) Foreign Application Priority Data

May 23, 2016 (JP) .................................. 2016-102175

(51) Int. Cl.
| | |
|---|---|
| G02B 26/08 | (2006.01) |
| G02B 26/10 | (2006.01) |
| G09G 3/00 | (2006.01) |
| H04N 5/74 | (2006.01) |
| G02B 6/35 | (2006.01) |

(Continued)

(52) U.S. Cl.
CPC ....... *G02B 26/0841* (2013.01); *G02B 26/105* (2013.01); *G09G 3/002* (2013.01); *H04N 5/7458* (2013.01); *G02B 6/3518* (2013.01); *G02B 17/006* (2013.01); *G02B 26/0816* (2013.01); *G02B 27/0068* (2013.01); *G02B 27/0977* (2013.01); *G03B 21/008* (2013.01); *G09G 3/346* (2013.01)

(58) Field of Classification Search
CPC .. G02B 26/00; G02B 26/105; G02B 26/0833; G02B 26/0841; G02B 26/08; G02F 1/29
USPC ......... 359/197.1, 198.1, 199.1, 199.2, 200.6, 359/201.2, 212.1, 213.1, 214.1, 223.1, 359/224.1, 224.2, 225.1, 226.1, 230, 290, 359/291, 295, 298
See application file for complete search history.

(56) References Cited

U.S. PATENT DOCUMENTS

2006/0245031 A1* 11/2006 Gong ................. G02B 26/0841
359/291
2006/0279496 A1 12/2006 Ogikubo et al.
(Continued)

FOREIGN PATENT DOCUMENTS

| JP | 2003-0098448 A | 4/2003 |
|---|---|---|
| JP | 2004-347769 A | 12/2004 |

(Continued)

*Primary Examiner* — William Choi
(74) *Attorney, Agent, or Firm* — Oliff PLC

(57) ABSTRACT

An electro-optical device includes a mirror being positioned above a surface of a substrate and modulating light, a torsion hinge being positioned between the mirror and the substrate, and supporting the mirror via a mirror support post such that the mirror is pivotable about an axis, and address electrodes being positioned between the mirror and the substrate, and supplying electrostatic forces between the address electrodes and the mirror. Each of the address electrodes includes a first address electrode that is positioned on a side of the axis in plan view, and a second address electrode that is positioned on the opposite side of the axis with respect to the first address electrode in plan view. The first address electrode and the second address electrode are driven independently of each other.

11 Claims, 12 Drawing Sheets

(51) Int. Cl.
  *G02B 17/00* (2006.01)
  *G02B 27/00* (2006.01)
  *G02B 27/09* (2006.01)
  *G09G 3/34* (2006.01)
  *G03B 21/00* (2006.01)

(56) References Cited

U.S. PATENT DOCUMENTS

| 2008/0030840 A1 | 2/2008 | Mangrum |
| 2009/0097091 A1 | 4/2009 | Mangrum |
| 2011/0043892 A1 | 2/2011 | Smith et al. |
| 2014/0036345 A1 | 2/2014 | Smith et al. |

FOREIGN PATENT DOCUMENTS

| JP | 2006-343590 A | 12/2006 |
| JP | 2013-502622 A | 1/2013 |
| JP | 2013-182029 A | 9/2013 |
| WO | 2011/028504 A2 | 3/2011 |

* cited by examiner

ELECTRO-OPTICAL DEVICE AND ELECTRONIC DEVICE

BACKGROUND

1. Technical Field

The present invention relates to an electro-optical device and an electronic device that modulate light emitted from a light source unit by mirrors.

2. Related Art

As an electronic device including mirrors, there is proposed a display device in which light emitted from a light source unit is modulated by an electro-optical device called a digital micromirror device (DMD) and then the modulated light is projected in an enlarged manner by a projection optical system. In this electronic device, the electro-optical device includes a substrate, a light-modulation mirror positioned above a surface of the substrate, and a torsion hinge that supports the mirror via a mirror support post and positioned between the mirror and the substrate such that the mirror is pivotable about an axis. Further, the electro-optical device includes, between the mirror and the substrate, a bias electrode that supplies a bias voltage to the mirror via the torsion hinge, and address electrodes that cause the mirror to pivot about the axis by electrostatic forces supplied between the address electrodes and the mirror.

Thus, when address voltages are supplied to the address electrodes while a bias voltage is supplied from the bias electrode to the mirror via the torsion hinge, electrostatic forces are supplied between the mirror and the address electrodes and therefore the posture of the mirror can be switched between an ON posture in which the light from the light source unit is reflected in an ON direction toward the projection optical system and an OFF posture in which the light from the light source unit is reflected in an OFF direction different from the ON direction. Accordingly, the light from the light source unit can be modulated (see US 2008/0030840 A1).

In the electro-optical device described in US 2008/0030840 A1 or the like, the mirror may wobble when the posture of the mirror is switched. The wobbling is not preferred because light leak is caused and the degree of contrast reduces. Therefore, studies have been conducted on the planar shape of the address electrode, the timing to apply a voltage between the mirror and the bias electrode, and the like. However, it is difficult to sufficiently suppress the wobbling of the mirror because of low degree of freedom for changes in conditions.

SUMMARY

An advantage of some aspects of the invention is that an electro-optical device and an electronic device in which wobbling of a mirror and the like can be suppressed are provided.

An electro-optical device according to an aspect of the invention includes a substrate, a mirror being positioned above a surface of the substrate and modulating light, a torsion hinge being positioned between the mirror and the substrate, and supporting the mirror via a mirror support post such that the mirror is pivotable about an axis, a bias electrode being positioned between the torsion hinge and the substrate, and supplying a bias voltage to the mirror via the torsion hinge, and an address electrode being positioned on a side of the axis in plan view between the mirror and the substrate, and supplying an electrostatic force between the address electrode and the mirror to pivot about the axis. The address electrode includes a first address electrode that is positioned on a side of the axis in plan view, and a second address electrode that is positioned on an opposite side of the axis with respect to the first address electrode in plan view, and is driven independently of the first address electrode.

In this aspect of the invention, the address electrode includes the plurality of address electrodes (first address electrode and second address electrode) that are different from each other in terms of distances from the axis. The plurality of address electrodes can be driven independently of each other. Thus, the voltages supplied to the plurality of address electrodes and the timings to switch the voltages can be optimized. Therefore, the direction of the electrostatic force to be generated between the mirror and each of the address electrodes and the magnitude of the electrostatic force in each direction can be made appropriate, thereby being capable of, for example, suppressing the wobbling when the posture of the mirror is switched, that is, stably switching the posture of the mirror.

In this case, there may be employed an embodiment in which the second address electrode is, for example, a substrate-side electrode that is provided on the surface of the substrate.

In this case, there may be employed an embodiment in which the first address electrode is an elevated electrode that is provided at a position spaced away from the substrate. According to this embodiment, a great electrostatic force can be generated between the first address electrode and the mirror.

In this case, there may be employed an embodiment in which timings to switch voltages supplied to the first address electrode and the second address electrode are different from each other in at least one driving period.

In this case, there may be employed an embodiment in which voltages supplied to the first address electrode and the second address electrode are different from each other in at least one driving period.

In this case, there may be employed an embodiment in which, in the at least one driving period, a voltage difference between the second address electrode and the mirror is smaller than a voltage difference between the first address electrode and the mirror.

In this case, there may be employed an embodiment in which the address electrode further includes a third address electrode that is provided between the first address electrode and the second address electrode in plan view, and the first address electrode, the second address electrode, and the third address electrode are driven independently of each other. According to this embodiment, the voltages supplied to the address electrodes and the timings to switch the voltages can be combined with each other more appropriately. Therefore, the direction of the electrostatic force to be generated between the mirror and each of the address electrodes and the magnitude of the electrostatic force in each direction can be made appropriate, thereby being capable of, for example, suppressing the wobbling when the posture of the mirror is switched, that is, stably switching the posture of the mirror. Accordingly, the occurrence of light leaking or the like is suppressed.

In this case, there may be employed an embodiment in which the third address electrode is a lower-stage elevated electrode that is provided at a position spaced away from the substrate, and the first address electrode is an upper-stage elevated electrode that is provided at a position spaced away from the substrate on a side closer to the mirror than the third address electrode.

In this case, there may be employed an embodiment in which the address electrode is provided on each side across the axis in plan view. According to this embodiment, the mirror can be caused to pivot in one direction and another direction about the axis.

In this case, there may be employed an embodiment in which the torsion hinge supports the mirror such that the mirror is pivotable about a first axis as the axis and a second axis intersecting the first axis, and the address electrode is provided on each of one side of the first axis and one side of the second axis in plan view. According to this embodiment, the mirror can be caused to pivot about the first axis and the second axis.

The electro-optical device according to the aspect of the invention may be used for various electronic devices. When the electronic device is constructed as a projection-type display device, the electronic device (projection-type display device) includes a light source unit that radiates light onto the mirror, and a projection optical system that projects modulated light output from the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
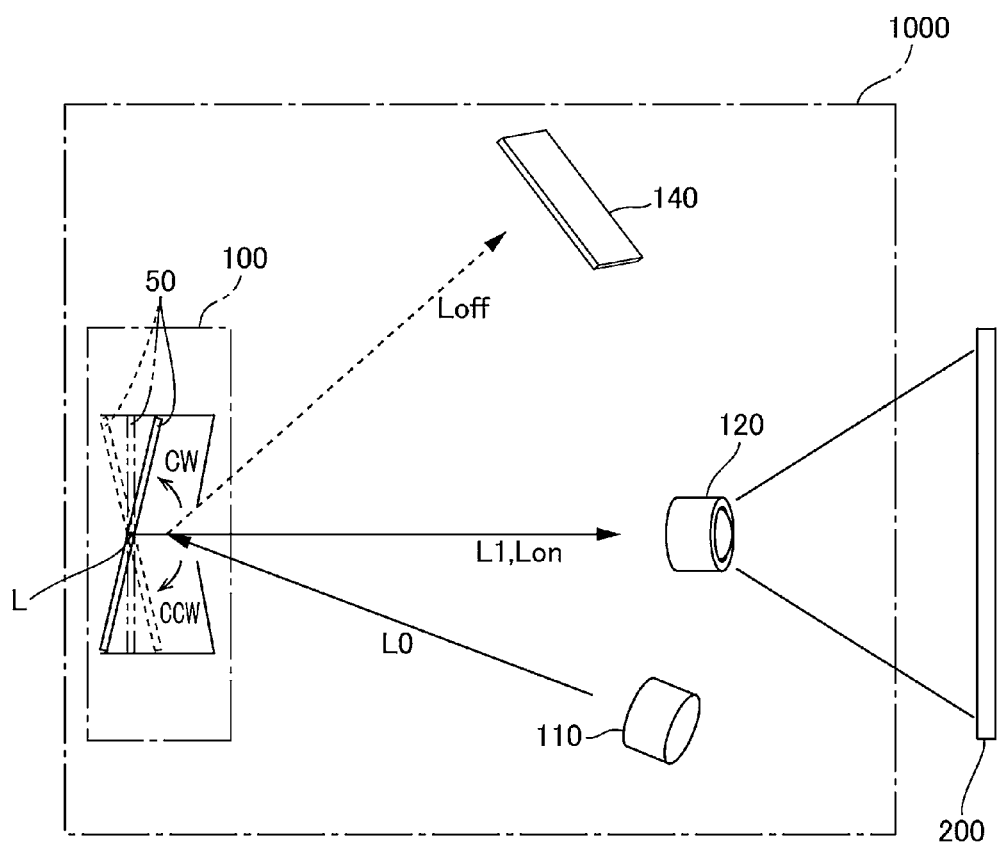
FIG. 1 is an explanatory view of an electronic device (projection-type display device) to which the invention is applied.

Embodiments of the invention are described with reference to the drawings. In the drawings that are referred to in the following description, respective layers and members are illustrated on different scales so that the respective layers and members are illustrated in sizes large enough to be recognizable in the drawings. The numbers of mirrors and the like illustrated in the drawings are set so that the mirrors and the like are illustrated in sizes large enough to be recognizable in the drawings, but the numbers of mirrors and the like to be provided may be set larger than the numbers of mirrors and the like illustrated in the drawings.

First Embodiment

Overall Structure of Electronic Device 1000

FIG. 1 is an explanatory view of an electronic device 1000 (projection-type display device) to which the invention is applied. FIG. 1 illustrates only one of a plurality of mirrors 50 provided in an electro-optical device 100. FIG. 1 illustrates a steady posture of the mirror 50 by a two-dot chain line, an ON posture by a solid line, and an OFF posture by a dotted line.

The electronic device 1000 illustrated in FIG. 1 includes a light source unit 110 and the electro-optical device 100 that modulates light radiated from the light source unit 110 based on image information. Further, the electronic device 1000 includes a projection optical system 120 that projects the light as a projection image modulated by the electro-optical device 100 onto a projection plane 200 such as a wall or a screen. Thus, the electronic device 1000 serves as a projection-type display device. The light source unit 110 sequentially emits red light, green light, and blue light. The electro-optical device 100 sequentially performs light modulation on the red light, the green light, and the blue light and outputs the modulated light to the projection optical system 120. In this manner, a color image can be displayed.

For example, a structure in which white light emitted from a light source is output to the electro-optical device 100 through a color filter (not shown) may be employed for the light source unit 110. Further, a structure in which red light, green light, and blue light are sequentially emitted by sequentially turning on a light emitting element that emits red light, a light emitting element that emits green light, and a light emitting element that emits blue light may be employed for the light source unit 110. In any case, the electro-optical device 100 modulates incident light in synchronization with a timing when the light source unit 110 emits red light, green light, and blue light.

Basic Structure of Electro-Optical Device 100

Figure 2:
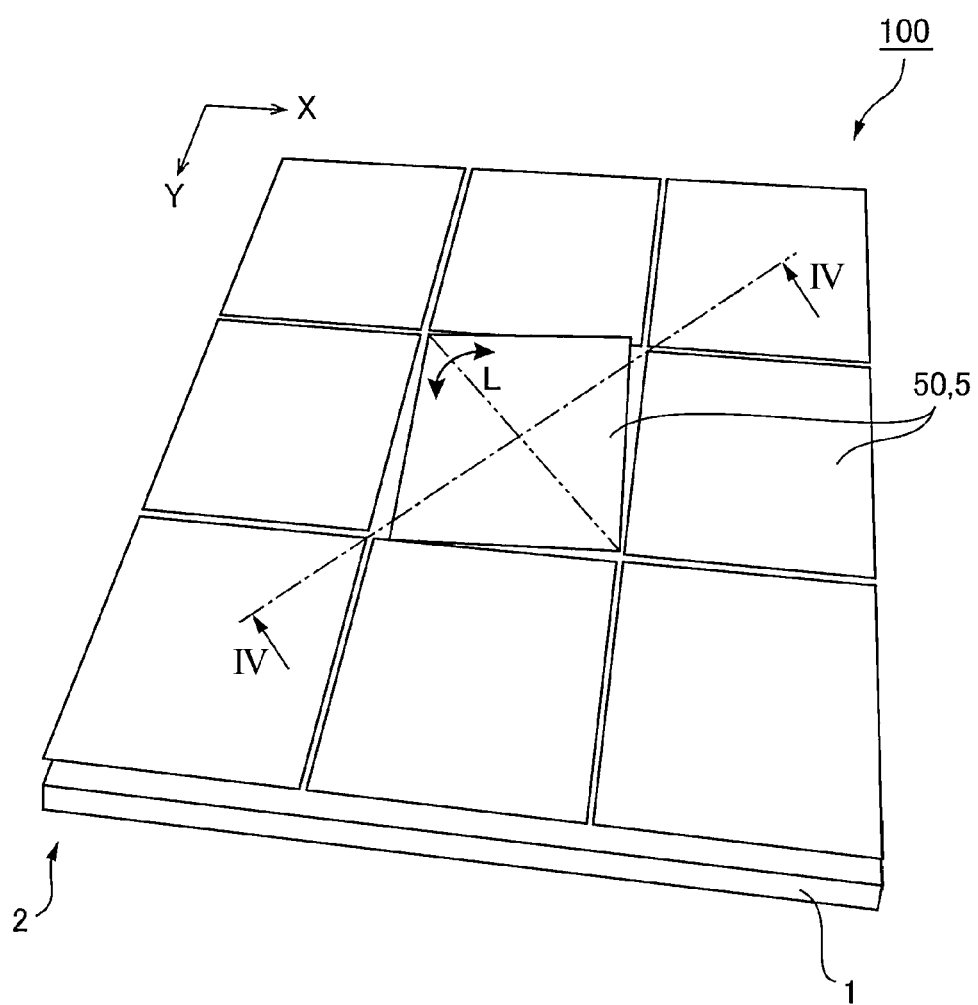
FIG. 2 is an explanatory view of mirrors provided in an electro-optical device according to a first embodiment of the invention.
Figure 3:
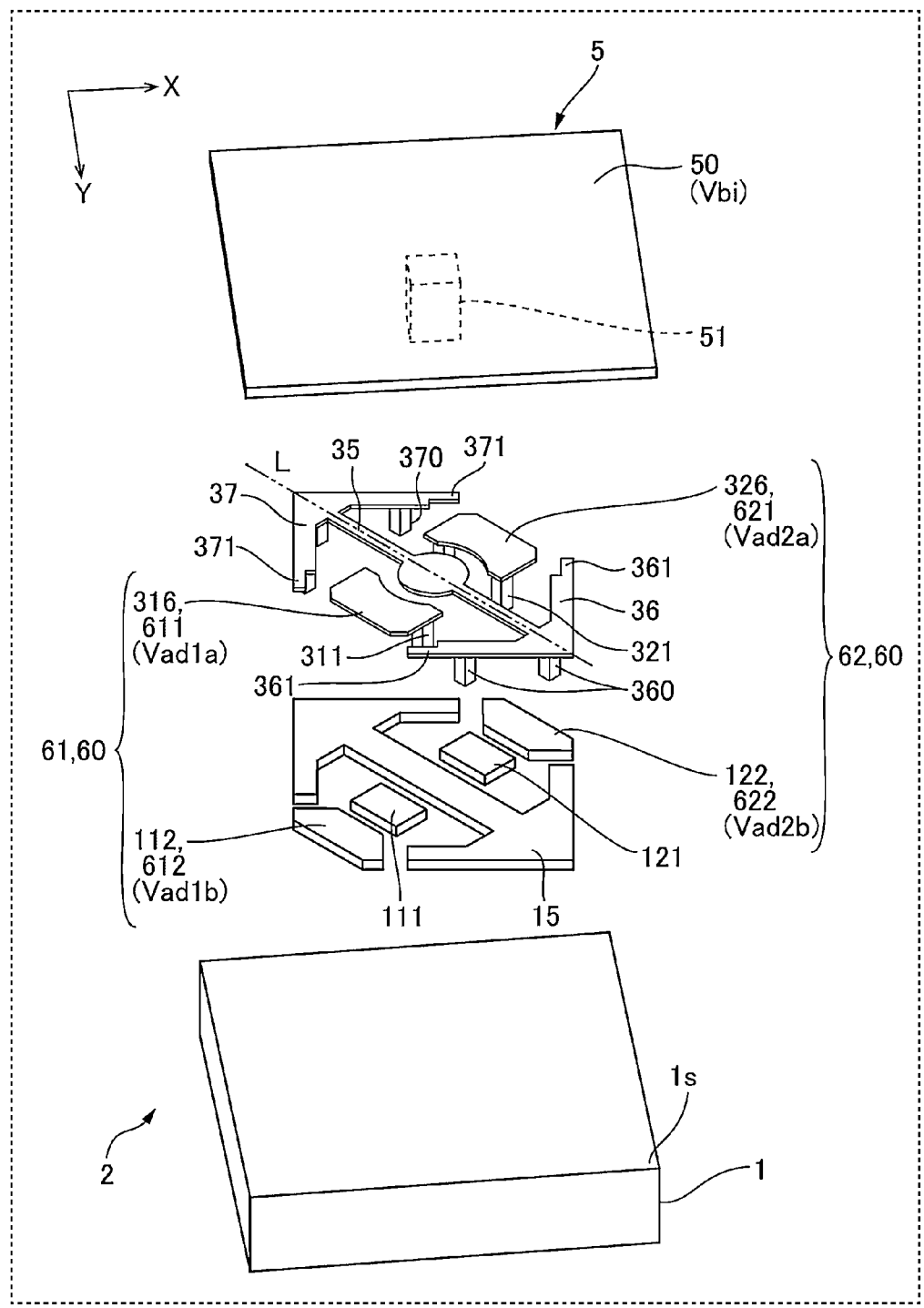
FIG. 3 is an explanatory view of, for example, address electrodes that drive the mirror illustrated in FIG. 2.
Figure 4:
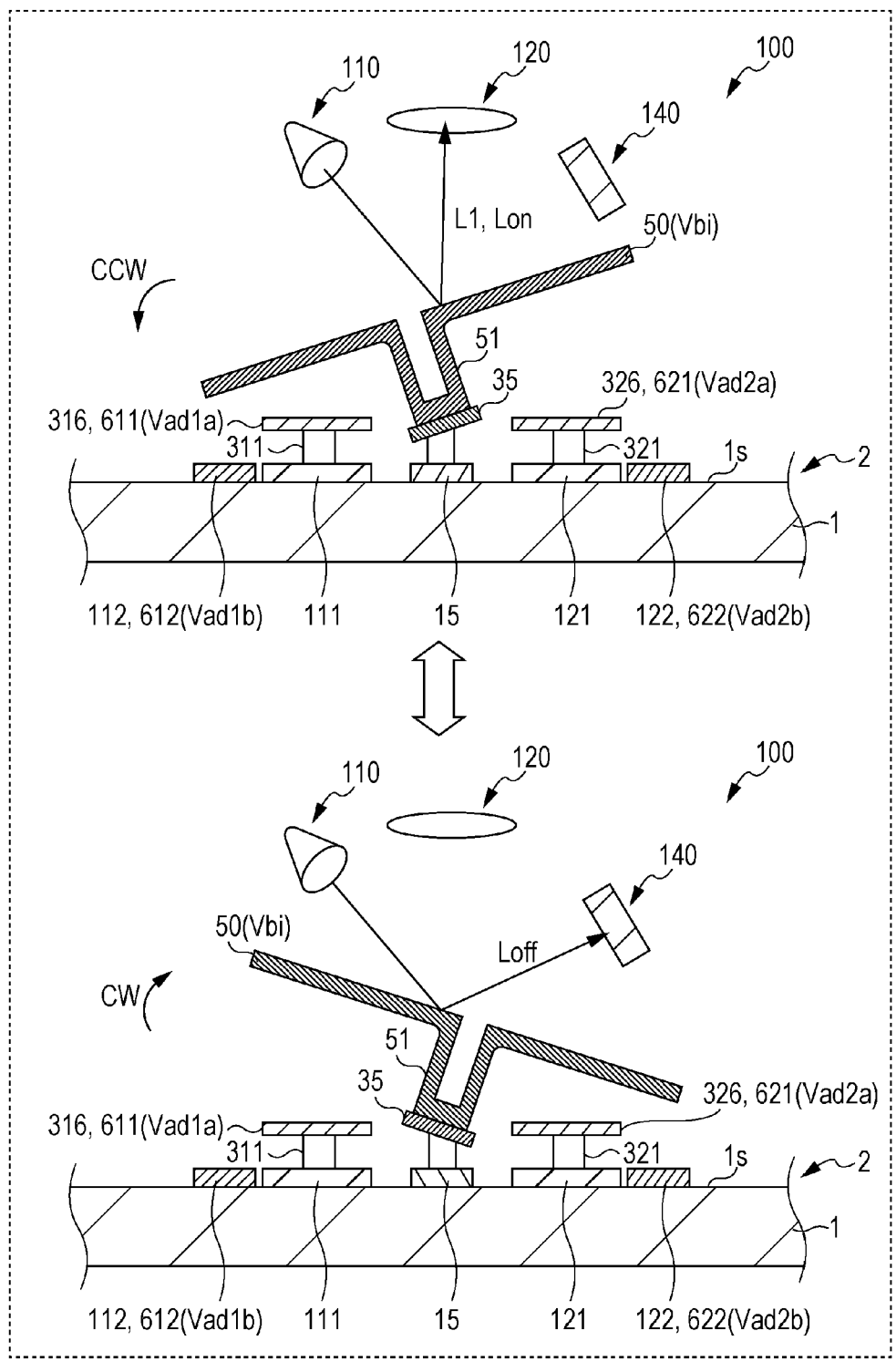
FIG. 4 is an explanatory view schematically illustrating a cross section around the mirror, which is taken along the line IV-IV of FIG. 2.

FIG. 2 is an explanatory view of the mirrors 50 provided in the electro-optical device 100 according to the first embodiment of the invention. FIG. 3 is an explanatory view of, for example, address electrodes 60 that drive the mirror 50 illustrated in FIG. 2. FIG. 4 is an explanatory view schematically illustrating a cross section around the mirror 50, which is taken along the line IV-IV of FIG. 2. FIG. 4 illustrates the ON posture of the mirror 50 that is tilted in a direction CCW about an axis L and the OFF posture of the mirror 50 that is tilted in another direction CW about the axis L.

As illustrated in FIG. 2, FIG. 3, and FIG. 4, the electro-optical device 100 includes a chip 2 having the plurality of light-modulation mirrors 50 positioned above a surface is of a substrate 1. In the chip 2, the mirror 50 is spaced away from the surface is of the substrate 1. The part where one mirror 50 is arranged is a unit mirror portion 5. In this embodiment, the unit mirror portions 5 are arranged in matrix in a first direction X and a second direction Y.

The substrate 1 is, for example, a silicon substrate. The mirror 50 is formed of a single-layer film of aluminum, a laminated film of aluminum and titanium, or the like. The thickness of the mirror 50 is 1 μm or less, for example, 0.3 μm. The mirror 50 is a micro-mirror having a planar shape of, for example, 10 to 30 μm on each side. The mirrors 50 are arranged in an array of, for example, 800×600 to 11920×1080, and one mirror 50 (unit mirror portion 5) corresponds to one pixel of the projection image.

As illustrated in FIG. 3 and FIG. 4, the electro-optical device 100 includes, at positions that overlap the mirror 50 in plan view between the mirror 50 and the substrate 1, a torsion hinge 35 that supports the mirror 50 via a mirror support post 51 such that the mirror 50 is pivotable about the axis L, a bias electrode 15 that overlaps the torsion hinge 35 in plan view, and the address electrodes 60 that are positioned on the sides of the axis L in plan view. The address electrodes 60 constitute a drive element that generates an electrostatic force between the drive element and the mirror 50 to pivot the mirror 50 about the axis L.

The bias electrode 15 is formed on the surface is of the substrate 1. The torsion hinge 35 extends along the axis L at a position spaced away from the mirror 50 and the substrate 1. Hinge arms 36 and 37 integrated with the torsion hinge 35 are provided at both ends of the torsion hinge 35. The bias electrode 15 supports the hinge arms 36 and 37 via hinge support posts 360 and 370, respectively. Therefore, the bias electrode 15 can apply a bias voltage Vbi to the mirror 50 via the hinge support posts 360 and 370, the hinge arms 36 and 37, the torsion hinge 35, and the mirror support post 51. The mirror support post 51 is a conductive film integrally formed with the mirror 50, and the hinge support posts 360 and 370 are conductive films integrally formed with the hinge arms 36 and 37, respectively. Spring tips 361 and 371 that regulate a pivot range of the mirror 50 by being brought into abutment against the mirror 50 when the mirror 50 has pivoted about the axis L are provided at the ends of the hinge arms 36 and 37, respectively.

Structure of Address Electrodes 60

In this embodiment, the address electrodes 60 are provided as address electrodes 61 and 62 on both sides across the axis L in plan view. Further, each of the address electrodes 60 (address electrodes 61 and 62) is divided into a plurality of address electrodes in a direction orthogonal to the axis L. The plurality of address electrodes are driven independently of each other.

More specifically, the address electrode 61 arranged on one side with respect to the axis L includes, on the one surface is of the substrate 1, a substrate-side electrode 111 arranged on the side of the axis L in plan view, and a substrate-side electrode 112 arranged on the opposite side of the axis L with respect to the substrate-side electrode 111. The substrate-side electrode 111 and the substrate-side electrode 112 are separated from each other. Further, the address electrode 61 includes an elevated electrode 316 spaced away from both of the substrate 1 and the mirror 50. The elevated electrode 316 is supported on the substrate-side electrode 111 via electrode support posts 311.

In the address electrode 61 constructed as described above, the elevated electrode 316 is a first address electrode 611 that generates an electrostatic force between the first address electrode 611 and the mirror 50. When a first address voltage Vad1a is supplied to the substrate-side electrode 111 on the substrate 1, the first address voltage Vad1a is supplied from the substrate-side electrode 111 to the first address electrode 611 via the electrode support posts 311. The substrate-side electrode 112 is a second address electrode 612 that generates an electrostatic force between the second address electrode 612 and the mirror 50 at a position spaced farther away from the axis L than the first address electrode 611. A second address voltage Vad1b is supplied from the substrate 1 to the second address electrode 612. The substrate-side electrode 111 and the substrate-side electrode 112 are separated from each other, and hence the first address electrode 611 and the second address electrode 612 are driven independently of each other. More specifically, when the mirror 50 is driven, the first address voltage Vad1a to be supplied to the first address electrode 611 and the second address voltage Vad1b to be supplied to the second address electrode 612 may be set different from each other and may be switched at different timings.

Similarly, the address electrode 62 arranged on the other side with respect to the axis L includes, on the surface is of the substrate 1, a substrate-side electrode 121 arranged on the side of the axis L in plan view, and a substrate-side electrode 122 arranged on the opposite side of the axis L with respect to the substrate-side electrode 121. The substrate-side electrode 121 and the substrate-side electrode 122 are separated from each other. Further, the address electrode 62 includes an elevated electrode 326 spaced away from both of the substrate 1 and the mirror 50. The elevated electrode 326 is supported on the substrate-side electrode 121 via electrode support posts 321.

In the address electrode 62 constructed as described above, the elevated electrode 326 is a first address electrode 621 that generates an electrostatic force between the first address electrode 621 and the mirror 50. When a first address voltage Vad2a is supplied to the substrate-side electrode 121 on the substrate 1, the first address voltage Vad2a is supplied from the substrate-side electrode 121 to the first address electrode 621 via the electrode support posts 321. The substrate-side electrode 122 is a second address electrode 622 that generates an electrostatic force between the second address electrode 622 and the mirror 50 at a position spaced farther away from the axis L than the first address electrode 621. A second address voltage Vad2b is supplied from the substrate 1 to the second address electrode 622. The substrate-side electrode 121 and the substrate-side electrode 122 are separated from each other, and hence the first address electrode 621 and the second address electrode 622 are driven independently of each other. More specifically, when the mirror 50 is driven, the first address voltage Vad2a to be supplied to the first address electrode 621 and the second address voltage Vad2b to be supplied to the second address electrode 622 may be set different from each other and may be switched at different timings.

In this embodiment, the substrate-side electrodes 111, 112, 121, and 122 and the bias electrode 15 are formed on the same layer. The elevated electrodes 316 and 326, the torsion hinge 35, and the hinge arms 36 and 37 are formed on the same layer. The electrode support posts 311 are conductive films integrally formed with the elevated electrode 316, and the electrode support posts 321 are conductive films integrally formed with the elevated electrode 326.

Description of Pivot Operation and Other Features

In the electro-optical device 100 of this embodiment, during a period in which the driving of the mirror 50 is halted, the mirror 50 assumes the steady posture in which the mirror 50 is parallel to the substrate 1. In this state, the address voltages are supplied to the address electrodes 60 (address electrodes 61 and 62) while the bias voltage Vbi is supplied to the mirror 50, thereby causing the mirror 50 to pivot in the direction CCW about the axis L so as to assume the ON posture in which the mirror 50 is tilted to the address electrode 61. Then, the mirror 50 reflects light L0 emitted from the light source unit 110 in an ON direction Lon toward the projection optical system 120.

When the mirror 50 pivots in the other direction CW about the axis L so as to assume the OFF posture in which the mirror 50 is tilted to the address electrode 62 on the other side, the mirror 50 reflects the light L0 emitted from the light source unit 110 in an OFF direction Loff different from the ON direction Lon. Thus, the mirror 50 in the OFF posture does not reflect the light L0 from the light source unit 110 toward the projection optical system 120. In this embodiment, a light absorbing device 140 is provided in the OFF direction Loff.

This driving is performed in each of the plurality of mirrors 50 illustrated in FIG. 2. As a result, the light L0 emitted from the light source unit 110 is modulated to image light L1 by the plurality of mirrors 50 and is projected from the projection optical system 120 to display an image. The torsion hinge 35 turns when the mirror 50 pivots. When the driving of the mirror 50 is stopped by stopping the application of the address voltages to the address electrodes 61 and 62, the torsion hinge 35 exerts a force for returning the mirror 50 to the steady posture in which the mirror 50 is parallel to the substrate 1.

Driving Method

Figure 5:
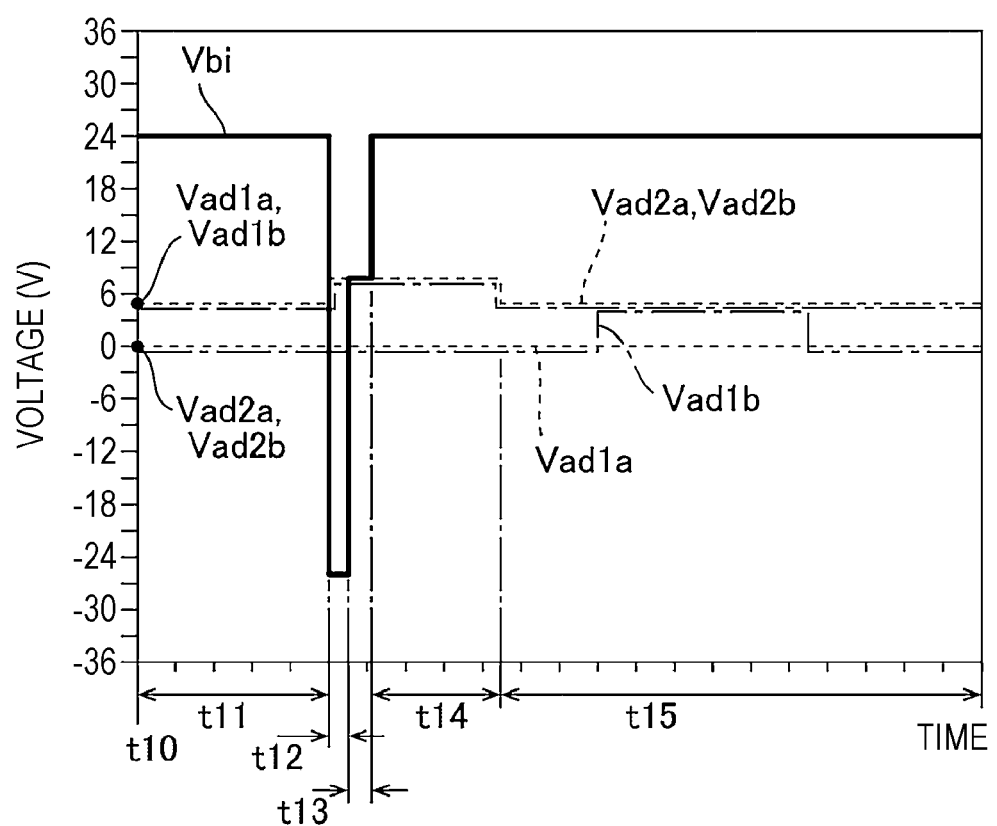
FIG. 5 is an explanatory diagram of address voltages and the like when the mirror is tilted in an opposite direction in the electro-optical device according to the first embodiment of the invention.
Figure 6:
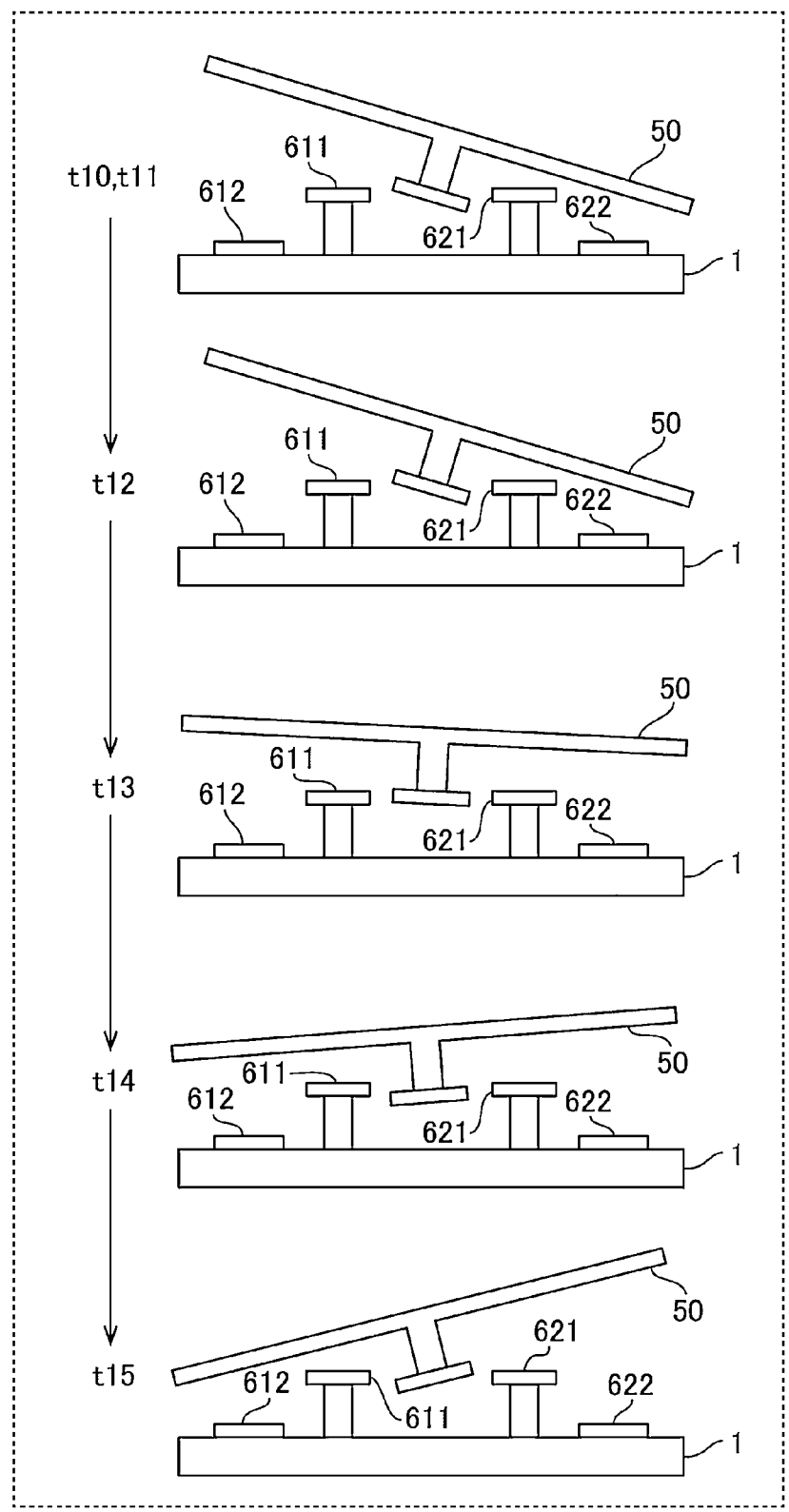
FIG. 6 is an explanatory view illustrating how the mirror is tilted in the opposite direction in the electro-optical device according to the first embodiment of the invention.
Figure 7:
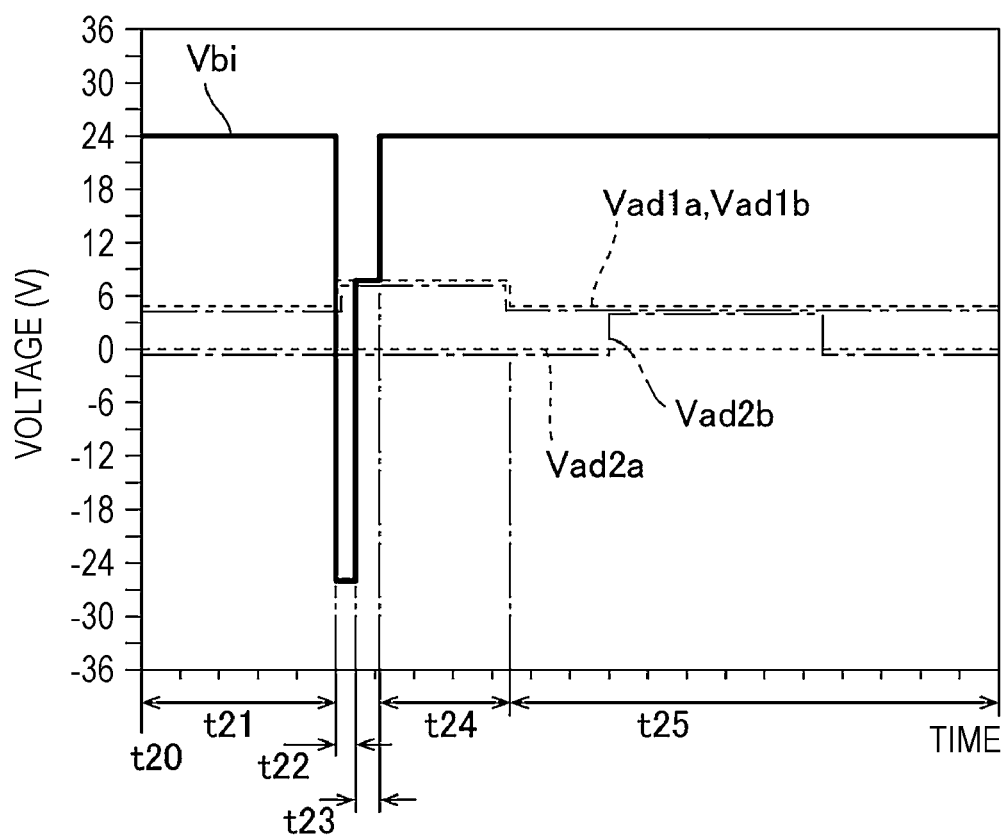
FIG. 7 is an explanatory diagram of the address voltages and the like when the mirror is tilted in the same direction in the electro-optical device according to the first embodiment of the invention.
Figure 8:
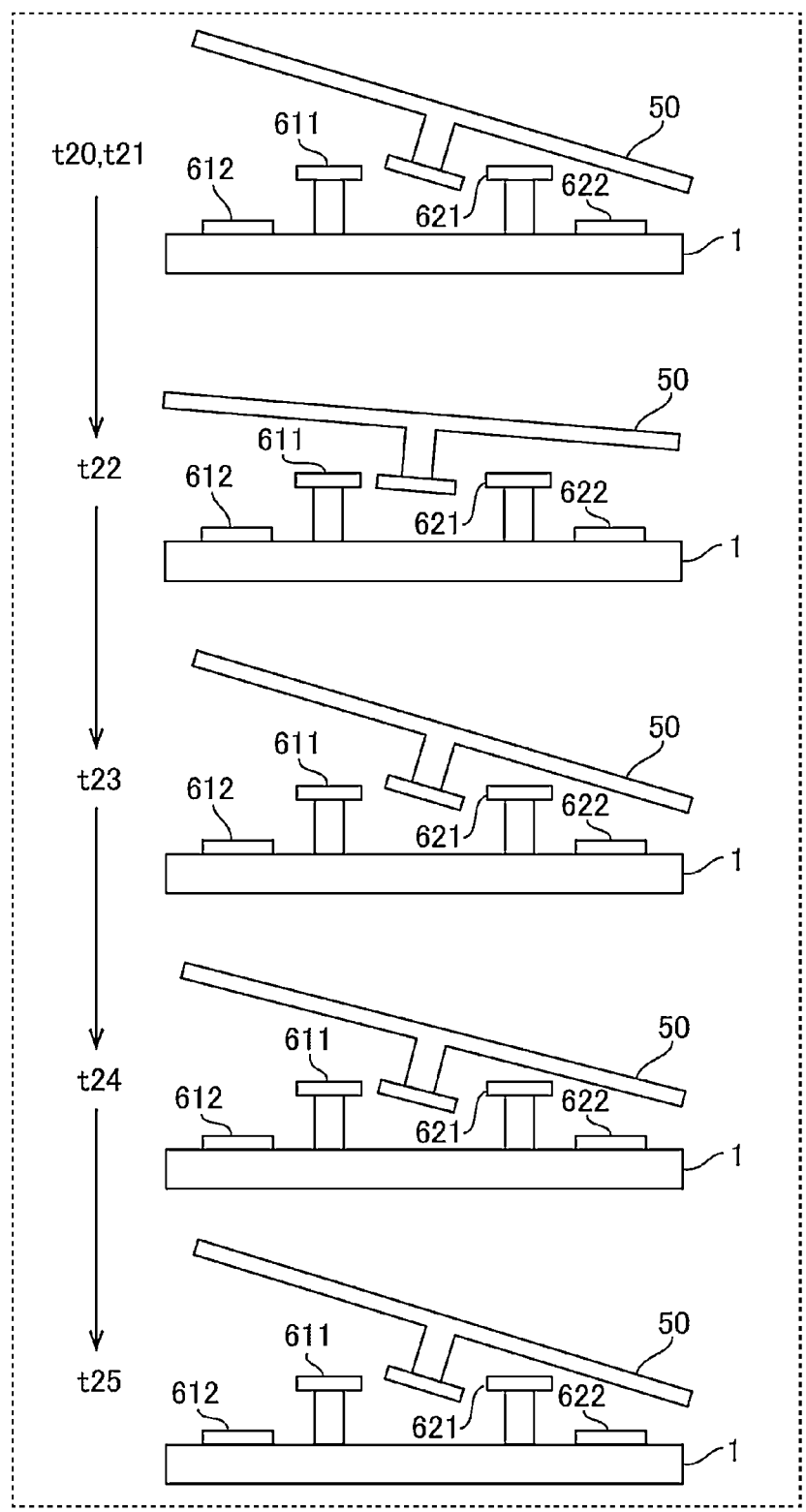
FIG. 8 is an explanatory view illustrating how the mirror is tilted in the same direction in the electro-optical device according to the first embodiment of the invention.

FIG. 5 is an explanatory diagram of the address voltages and the like when the mirror 50 is tilted in an opposite direction in the electro-optical device 100 according to the first embodiment of the invention. FIG. 6 is an explanatory view illustrating how the mirror 50 is tilted in the opposite direction in the electro-optical device 100 according to the first embodiment of the invention. FIG. 7 is an explanatory diagram of the address voltages and the like when the mirror 50 is tilted in the same direction in the electro-optical device 100 according to the first embodiment of the invention. FIG. 8 is an explanatory view illustrating how the mirror 50 is tilted in the same direction in the electro-optical device 100 according to the first embodiment of the invention. The voltage values and the like illustrated in FIG. 5 and FIG. 7 are examples and may be changed to optimum voltage values depending on the type of device and the like.

In FIG. 5 and FIG. 6, when a bias voltage Vbi of 24 V is supplied to the mirror 50, a first address voltage Vad1a of 5 V is supplied to the first address electrode 611, and a first address voltage Vad2a of 0 V is supplied to the first address electrode 621 at a time t10, the voltage difference between the mirror 50 and the first address electrode 611 is 19 V and the voltage difference between the mirror 50 and the first address electrode 621 is 24 V. Thus, the mirror 50 is tilted to the first address electrode 621 due to a difference between the electrostatic force between the mirror 50 and the first address electrode 611 and the electrostatic force between the mirror 50 and the first address electrode 621. That is, the mirror 50 is tilted in a direction to the first address electrode 621 having a large voltage difference from the mirror 50 out of the two first address electrodes 611 and 621.

When the mirror 50 in this state is tilted in an opposite direction (to the first address electrode 611), a bias voltage Vbi of 24 V is supplied to the mirror 50, a first address voltage Vad1a of 0 V is supplied to the first address electrode 611, and a first address voltage Vad2a of 5 V is supplied to the first address electrode 621 during a data rewriting period t11.

Next, a bias voltage Vbi of −26 V is supplied to the mirror 50, a first address voltage Vad1a of 0 V is supplied to the first address electrode 611, and a first address voltage Vad2a of 7.5 V is supplied to the first address electrode 621 during an attracting period t12. As a result, the voltage difference between the mirror 50 and the first address electrode 611 is 26 V and the voltage difference between the mirror 50 and the first address electrode 621 is 33.5 V. Thus, the mirror 50 is urged to the first address electrode 621.

Next, when a bias voltage Vbi of 7.5 V is supplied to the mirror 50, a first address voltage Vad1a of 0 V is supplied to the first address electrode 611, and a first address voltage Vad2a of 7.5 V is supplied to the first address electrode 621 during a releasing period t13, the voltage difference between the mirror 50 and the first address electrode 611 is 7.5 V and the voltage difference between the mirror 50 and the first address electrode 621 is 0 V. Thus, an elastic restoration force of the torsion hinge 35 and moment caused by the difference between the electrostatic force between the mirror 50 and the first address electrode 611 and the electrostatic force between the mirror 50 and the first address electrode 621 are supplied to the mirror 50. As a result, the mirror 50 is tilted to the first address electrode 611.

Next, when a bias voltage Vbi of 24 V is supplied to the mirror 50, a first address voltage Vad1a of 0 V is supplied to the first address electrode 611, and a first address voltage Vad2a of 7.5 V is supplied to the first address electrode 621 during a switching period t14, the voltage difference between the mirror 50 and the first address electrode 611 is 24 V and the voltage difference between the mirror 50 and the first address electrode 621 is 16.5 V. Thus, the mirror 50 is further tilted to the first address electrode 611.

Next, when a bias voltage Vbi of 24 V is supplied to the mirror 50, a first address voltage Vad1a of 0 V is supplied to the first address electrode 611, and a first address voltage Vad2a of 5 V is supplied to the first address electrode 621 during a stabilizing period t15, the voltage difference between the mirror 50 and the first address electrode 611 is 24 V and the voltage difference between the mirror 50 and the first address electrode 621 is 19 V. Thus, the mirror 50 is further tilted to the first address electrode 611.

Now, description is made of a case where the mirror 50 is tilted in the same direction again in a state in which the mirror 50 is tilted to the first address electrode 621 by applying a bias voltage Vbi of 24 V to the mirror 50, a first address voltage Vad1a of 5 V to the first address electrode 611, and a first address voltage Vad2a of 0 V to the first address electrode 621 at a time t20 as illustrated in FIG. 7 and FIG. 8.

First, a bias voltage Vbi of 24 V is supplied to the mirror 50, a first address voltage Vad1a of 5 V is supplied to the first address electrode 611, and a first address voltage Vad2a of 0 V is supplied to the first address electrode 621 during a data rewriting period t21. Next, when a bias voltage Vbi of −26 V is supplied to the mirror 50, a first address voltage Vad1a of 7.5 V is supplied to the first address electrode 611, and a first address voltage Vad2a of 0 V is supplied to the first address electrode 621 during an attracting period t22, the voltage difference between the mirror 50 and the first address electrode 611 is 33.5 V and the voltage difference between the mirror 50 and the first address electrode 621 is 26 V. Thus, the mirror 50 is urged to the first address electrode 611.

Next, when a bias voltage Vbi of 7.5 V is supplied to the mirror 50, a first address voltage Vad1a of 7.5 V is supplied to the first address electrode 611, and a first address voltage Vad2a of 0 V is supplied to the first address electrode 621 during a releasing period t23, the voltage difference between the mirror 50 and the first address electrode 611 is 0 V and the voltage difference between the mirror 50 and the first address electrode 621 is 7.5 V. Thus, the elastic restoration force of the torsion hinge 35 and the moment caused by the difference between the electrostatic force between the mirror 50 and the first address electrode 621 and the electrostatic force between the mirror 50 and the first address electrode 611 are supplied to the mirror 50. As a result, the mirror 50 is tilted to the first address electrode 621.

Next, when a bias voltage Vbi of 24 V is supplied to the mirror 50, a first address voltage Vad1a of 7.5 V is supplied to the first address electrode 611, and a first address voltage Vad2a of 0 V is supplied to the first address electrode 621 during a switching period t24, the voltage difference between the mirror 50 and the first address electrode 611 is 16.5 V and the voltage difference between the mirror 50 and the first address electrode 621 is 24 V. Thus, the mirror 50 is tilted to the first address electrode 621.

Next, when a bias voltage Vbi of 24 V is supplied to the mirror 50, a first address voltage Vad1a of 5 V is supplied to the first address electrode 611, and a first address voltage Vad2a of 0 V is supplied to the first address electrode 621 during a stabilizing period t25, the voltage difference between the mirror 50 and the first address electrode 611 is 19 V and the voltage difference between the mirror 50 and the first address electrode 621 is 24 V. Thus, the mirror 50 is further tilted to the first address electrode 621.

Voltages of Second Address Electrodes 612 and 622

When the driving that is described with reference to FIG. 5 to FIG. 8 is performed, in this embodiment, the timings to switch the voltages supplied to the first address electrode 611 and the second address electrode 612 are different from each other in at least one driving period. Further, the voltages supplied to the first address electrode 611 and the second address electrode 612 are different from each other in the at least one driving period. In the at least one driving period, the voltage difference between the second address electrode 612 and the mirror 50 is smaller than the voltage difference between the first address electrode 611 and the mirror 50. Similarly, the timings to switch the voltages supplied to the first address electrode 621 and the second address electrode 622 are different from each other in at least one driving period. Further, the voltages supplied to the first address electrode 621 and the second address electrode 622 are different from each other in the at least one driving period. In the at least one driving period, the voltage difference between the second address electrode 622 and the mirror 50 is smaller than the voltage difference between the first address electrode 621 and the mirror 50.

For example, when the driving that is described with reference to FIG. 5 and FIG. 6 is performed, the first address voltage Vad2a supplied to the first address electrode 621 and the second address voltage Vad2b supplied to the second address electrode 622 are equal to each other in any driving period.

The first address voltage Vad1a supplied to the first address electrode 611 and the second address voltage Vad1b supplied to the second address electrode 612 are equal to each other in substantially the whole driving periods, but are different from each other in the middle of the stabilizing period t15. More specifically, the first address voltage Vad1a supplied to the first address electrode 611 is 0 V in the entire stabilizing period t15, but the second address voltage Vad1b supplied to the second address electrode 612 is 5 V in the middle of the stabilizing period t15. Therefore, the force for urging the mirror 50 to the first address electrode 611 is strong until the middle of the stabilizing period t15, but becomes weaker when the second address voltage Vad1b supplied to the second address electrode 612 is switched to 5 V. Thus, the wobbling of the mirror 50 can be suppressed.

When the driving that is described with reference to FIG. 7 and FIG. 8 is performed, the first address voltage Vad1a supplied to the first address electrode 611 and the second address voltage Vad1b supplied to the second address electrode 612 are equal to each other in any driving period.

The first address voltage Vad2a supplied to the first address electrode 621 and the second address voltage Vad2b supplied to the second address electrode 622 are equal to each other in substantially the whole driving periods, but are different from each other in the middle of the stabilizing period t25. More specifically, the first address voltage Vad2a supplied to the first address electrode 621 is 0 V in the entire stabilizing period t25, but the second address voltage Vad2b supplied to the second address electrode 622 is 5 V in the middle of the stabilizing period t25. Therefore, the force for urging the mirror 50 to the first address electrode 621 is strong until the middle of the stabilizing period t25, but becomes weaker when the second address voltage Vad2b supplied to the second address electrode 622 is switched to 5 V. Thus, the wobbling of the mirror 50 can be suppressed.

In this embodiment, the first address voltage Vad1a and the second address voltage Vad1b and the timings to switch the first address voltage Vad1a and the second address voltage Vad1b are made different from each other in the stabilizing period t15, and the first address voltage Vad2a and the second address voltage Vad2b and the timings to switch the first address voltage Vad2a and the second address voltage Vad2b are made different from each other in the stabilizing period t25. The voltages and the timings to switch the voltages may be made different from each other in other periods.

Main Advantages of this Embodiment

As described above, in the electro-optical device 100 of this embodiment, the address electrodes 61 and 62 include the plurality of address electrodes (first address electrodes 611 and 621 and second address electrodes 612 and 622) that are different from each other in terms of distances from the pivot center axis (axis L) of the mirror 50. The first address electrodes 611 and 621 and the second address electrodes 612 and 622 can be driven independently of each other. Thus, the voltages supplied to the first address electrodes 611 and 621 and the second address electrodes 612 and 622 and the timings to switch the voltages can be optimized. Therefore, the direction of the electrostatic force to be generated between the mirror 50 and each of the address electrodes 61 and 62 and the magnitude of the electrostatic force in each direction can be made appropriate, thereby being capable of, for example, suppressing the wobbling when the posture of the mirror 50 is switched, that is, stably switching the posture of the mirror 50.

The second address electrodes 612 and 622 are the substrate-side electrodes 112 and 122 provided on the surface is of the substrate 1, and the first address electrodes 611 and 621 are the elevated electrodes 316 and 326 provided at the positions spaced away from the substrate 1. Therefore, a great electrostatic force can be generated between each of the first address electrodes 611 and 621 and the mirror 50.

Second Embodiment

Figure 9:
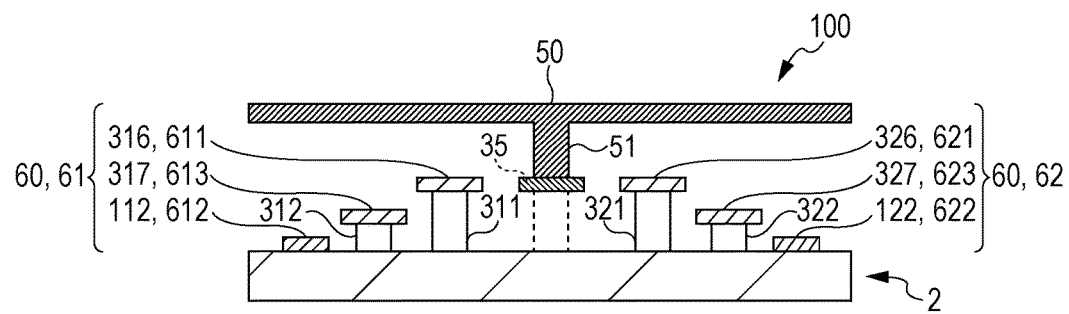
FIG. 9 is an explanatory view schematically illustrating a cross section of an electro-optical device according to a second embodiment of the invention.
Figure 10:
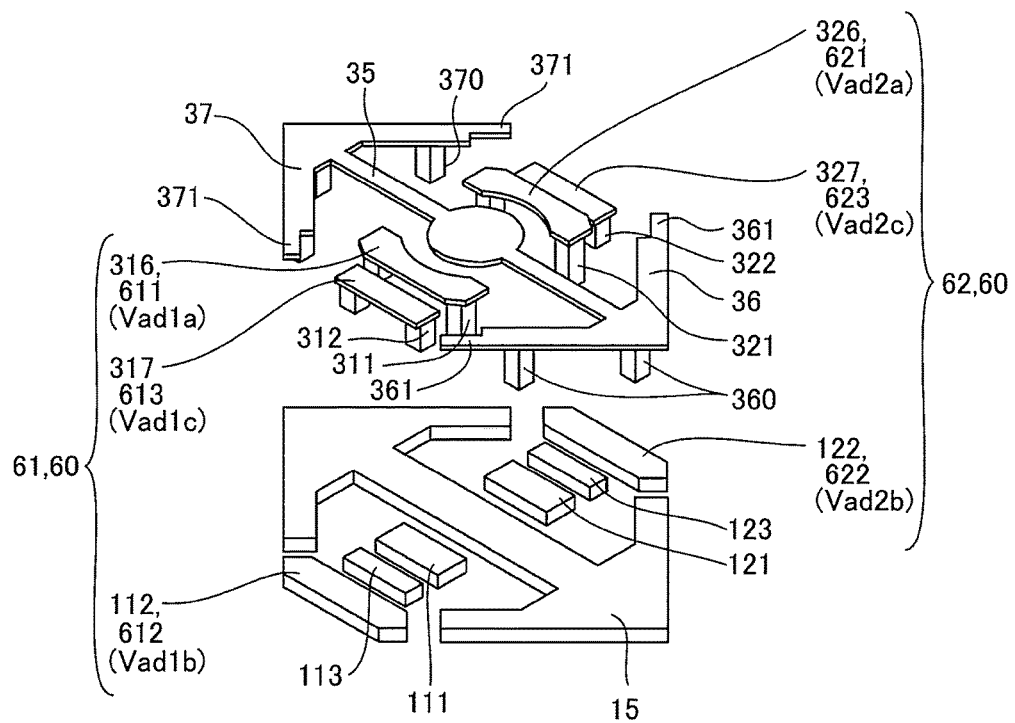
FIG. 10 is an explanatory view of address electrodes and the like illustrated in FIG. 9.

FIG. 9 is an explanatory view schematically illustrating a cross section of an electro-optical device 100 according to a second embodiment of the invention. FIG. 10 is an explanatory view of address electrodes 60 and the like illustrated in FIG. 9. The basic structure of this embodiment is similar to that of the first embodiment and therefore common parts are denoted by the same reference symbols to omit description thereof.

As illustrated in FIG. 9 and FIG. 10, in this embodiment, the address electrodes 60 are provided as the address electrodes 61 and 62 on both sides across the axis L in plan view similarly to the first embodiment. In this embodiment, the address electrode 61 includes a third address electrode 613 between the first address electrode 611 and the second address electrode 612. Similarly to the address electrode 61, the address electrode 62 includes a third address electrode 623 between the first address electrode 621 and the second address electrode 622.

More specifically, the address electrode 61 includes a substrate-side electrode 113 between the substrate-side electrode 111 and the substrate-side electrode 112 on the surface is of the substrate 1. The substrate-side electrodes 111, 112, and 113 are separated from each other. Further, the address electrode 61 includes an elevated electrode 317 that overlaps the substrate-side electrode 113 in plan view on the opposite side of the axis L with respect to the elevated electrode 316. The elevated electrode 317 is supported on the substrate-side electrode 113 via electrode support posts 312. The elevated electrode 317 is spaced away from the substrate 1 and the mirror 50 at a lower position from the substrate 1 than the elevated electrode 316. Thus, the elevated electrode 317 is a lower-stage elevated electrode and the elevated electrode 316 is an upper-stage elevated electrode.

In the address electrode 61 constructed as described above, the elevated electrode 317 is the third address electrode 613 that generates an electrostatic force between the third address electrode 613 and the mirror 50. When a third address voltage Vad1c is supplied to the substrate-side electrode 113 on the substrate 1, the third address voltage Vad1c is supplied from the substrate-side electrode 113 to the third address electrode 613 via the electrode support posts 312. The substrate-side electrodes 111, 112, and 113 are separated from each other, and hence the first address electrode 611, the second address electrode 612, and the third address electrode 613 are driven independently of each other. More specifically, when the mirror 50 is driven, the first address voltage Vad1a to be supplied to the first address electrode 611, the second address voltage Vad1b to be supplied to the second address electrode 612, and the third address voltage Vad1c to be supplied to the third address electrode 613 may be set different from each other and may be switched at different timings.

Similarly, the address electrode 62 includes a substrate-side electrode 123 between the substrate-side electrode 121 and the substrate-side electrode 122 on the surface is of the substrate 1. The substrate-side electrodes 121, 122, and 123 are separated from each other. Further, the address electrode 62 includes an elevated electrode 327 that overlaps the substrate-side electrode 123 in plan view on the opposite side of the axis L with respect to the elevated electrode 326. The elevated electrode 327 is supported on the substrate-side electrode 123 via electrode support posts 322. The elevated electrode 327 is spaced away from the substrate 1 and the mirror 50 at a lower position from the substrate 1 than the elevated electrode 326. Thus, the elevated electrode 327 is a lower-stage elevated electrode and the elevated electrode 326 is an upper-stage elevated electrode.

In the address electrode 62 constructed as described above, the elevated electrode 327 is the third address electrode 623 that generates an electrostatic force between the third address electrode 623 and the mirror 50. When a third address voltage Vad2c is supplied to the substrate-side electrode 123 on the substrate 1, the third address voltage Vad2c is supplied from the substrate-side electrode 123 to the third address electrode 623 via the electrode support posts 322. The substrate-side electrodes 121, 122, and 123 are separated from each other, and hence the first address electrode 621, the second address electrode 622, and the third address electrode 623 are driven independently of each other. More specifically, when the mirror 50 is driven, the first address voltage Vad2a to be supplied to the first address electrode 621, the second address voltage Vad2b to be supplied to the second address electrode 622, and the third address voltage Vad2c to be supplied to the third address electrode 623 may be set different from each other and may be switched at different timings.

According to the electro-optical device 100 constructed as described above, the voltages supplied to the address electrodes 61 and 62 and the timings to switch the voltages can be combined with each other more appropriately. Therefore, the direction of the electrostatic force to be generated between the mirror 50 and each of the address electrodes 61 and 62 and the magnitude of the electrostatic force in each direction can be made appropriate, thereby being capable of, for example, suppressing the wobbling when the posture of the mirror 50 is switched, that is, stably switching the posture of the mirror 50. Accordingly, the occurrence of light leaking or the like is suppressed.

Third Embodiment

Figure 11:
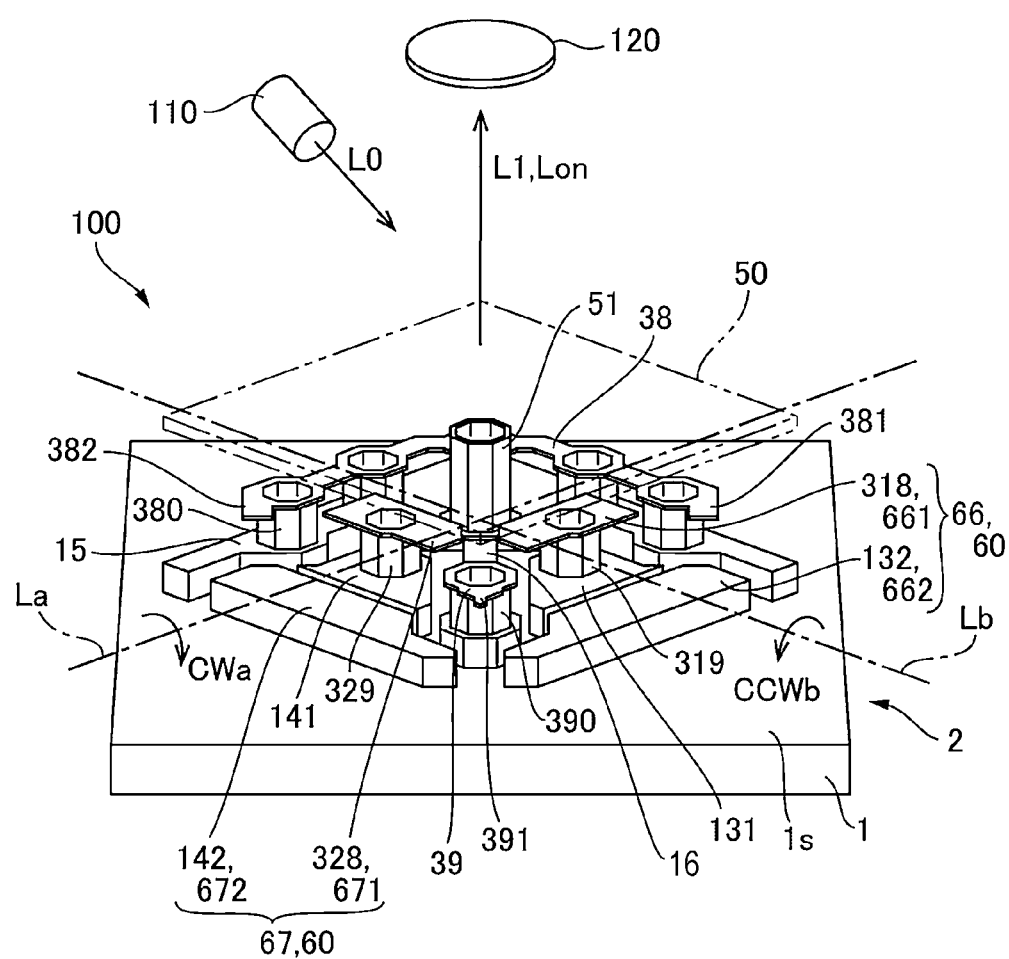
FIG. 11 is a partially enlarged perspective view illustrating an electro-optical device according to a third embodiment of the invention.
Figure 12:
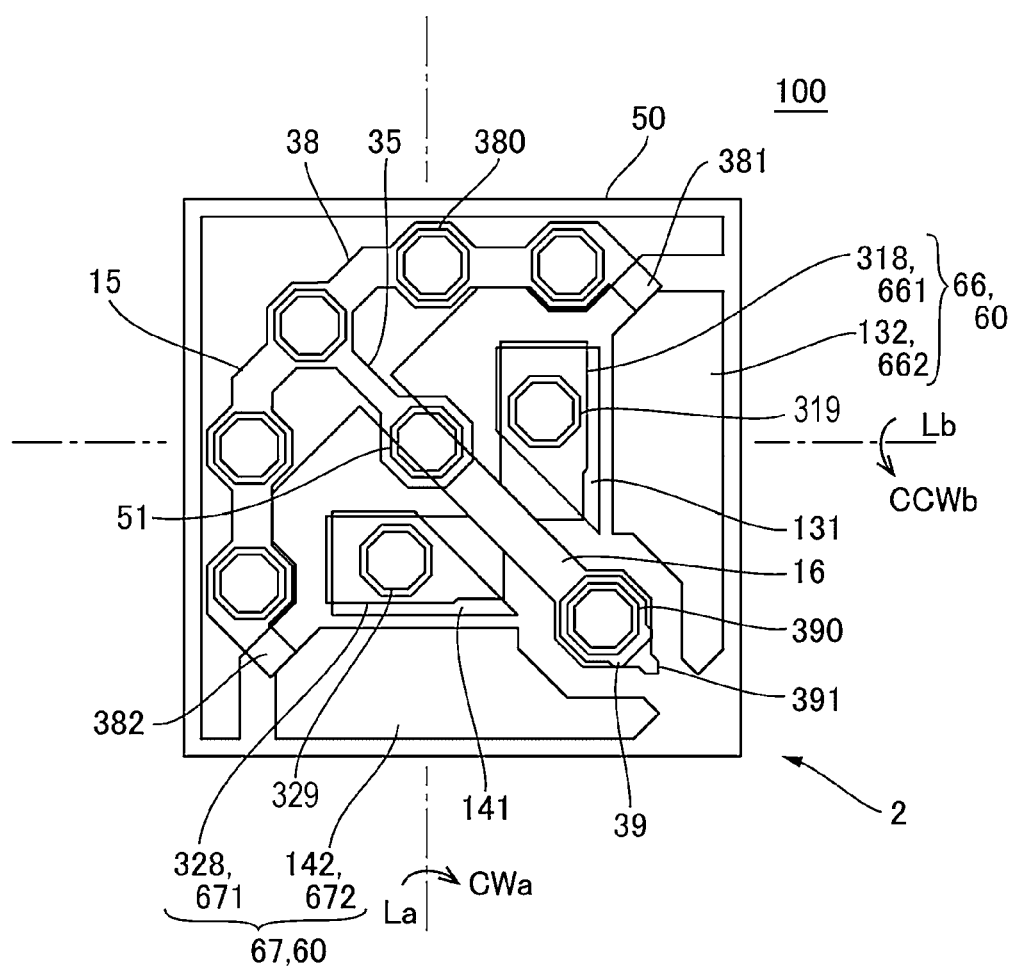
FIG. 12 is a plan view of a part of the electro-optical device illustrated in FIG. 11.
Figure 13:
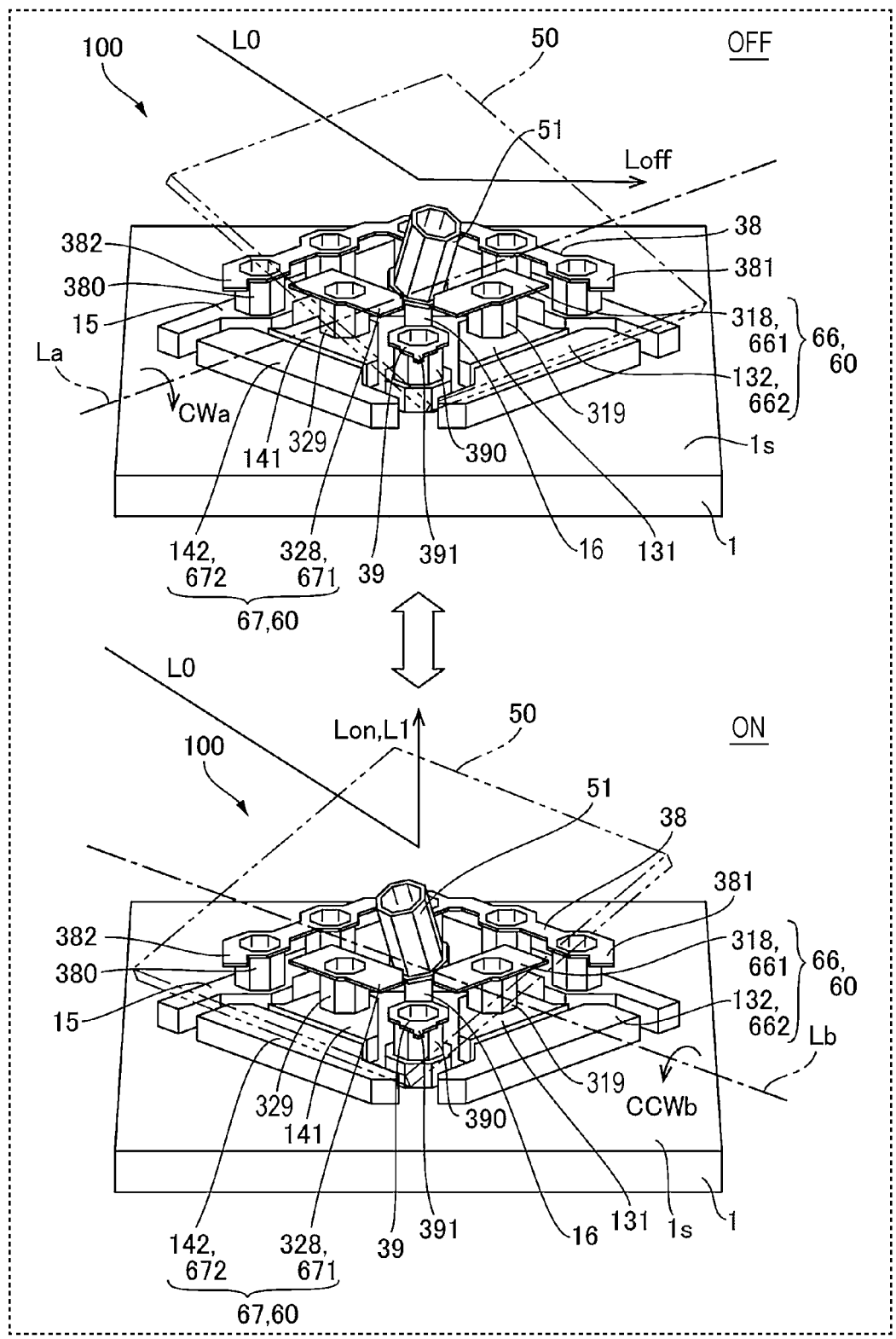
FIG. 13 is an explanatory view of a case where a mirror is driven in the electro-optical device illustrated in FIG. 11.

FIG. 11 is a partially enlarged perspective view illustrating an electro-optical device 100 according to a third embodiment of the invention. FIG. 11 illustrates a steady posture. FIG. 12 is a plan view of a part of the electro-optical device 100 illustrated in FIG. 11. FIG. 13 is an explanatory view of a case where the mirror 50 is driven in the electro-optical device 100 illustrated in FIG. 11. FIG. 13 illustrates an OFF posture of the mirror 50 that is tilted in the direction CWa about a first axis La and an ON posture of the mirror 50 that is tilted in the direction CCWb about a second axis Lb. FIG. 11 and FIG. 13 illustrate the mirror 50 by a two-dot chain line.

In the electro-optical device 100 according to each of the first and second embodiments, the mirror 50 pivots about the single axis L. In this embodiment, as described below with reference to FIG. 11, FIG. 12, and FIG. 13, the mirror 50 is pivotable about the first axis La extending while overlapping the mirror 50 in plan view and about the second axis Lb orthogonal to the first axis La while overlapping the mirror 50 in plan view. In this embodiment, as illustrated in FIG. 12, the mirror 50 pivots in the direction CWa about the first axis La so as to assume the OFF posture, and also pivots in the direction CCWb about the second axis Lb so as to assume the ON posture.

More specifically, as illustrated in FIG. 11 and FIG. 12, the electro-optical device 100 includes the bias electrode 15, a hinge arm 38, the torsion hinge 35, the address electrodes 60, and the like at the positions that overlap the mirror 50 in plan view between the mirror 50 and the substrate 1. In this embodiment, the bias electrode 15 extends parallel to the first axis La and the second axis Lb on the surface is of the substrate 1. The hinge arm 38 extends along the bias electrode 15 and is supported by the bias electrode 15 via hinge support posts 380. The hinge 35 protrudes from a bent portion of the hinge arm 38 in a direction intersecting the first axis La and the second axis Lb. The mirror 50 is supported at the distal end of the torsion hinge 35 via the mirror support post 51. Thus, the mirror 50 is supported by the torsion hinge 35 so as to be pivotable about the first axis La and the second axis Lb. The bias electrode 15 can apply the bias voltage Vbi to the mirror 50 via the hinge support posts 380, the hinge arm 38, the torsion hinge 35, and the mirror support post 51.

A center bias electrode 16 extends from the bias electrode 15 along the hinge 35. An electrode 39 formed on the same layer as that of the hinge arm 38 is supported at the distal end of the center bias electrode 16 via an electrode support post 390. Spring tips 381, 382, and 391 to be brought into abutment against the mirror 50 when the mirror 50 is tilted are formed on the hinge arm 38 and the electrode 39.

In this embodiment, the address electrodes 60 are constructed as an address electrode 66 located on a side with respect to the first axis La in plan view, and an address electrode 67 located on the side with respect to the second axis Lb in plan view. The address electrode 66 is divided into a plurality of address electrodes in a direction orthogonal to the first axis La. The plurality of address electrodes are driven independently of each other. The address electrode 67 is divided into a plurality of address electrodes in a direction orthogonal to the second axis Lb. The plurality of address electrodes are driven independently of each other.

More specifically, the address electrode 66 arranged on a side with respect to the first axis La includes, on the surface is of the substrate 1, a substrate-side electrode 131 arranged on the side of the first axis La in plan view, and a substrate-side electrode 132 arranged on the opposite side of the first axis La with respect to the substrate-side electrode 131. The substrate-side electrode 131 and the substrate-side electrode 132 are separated from each other. Further, the address electrode 66 includes an elevated electrode 318 spaced away from both of the substrate 1 and the mirror 50. The elevated electrode 318 is supported on the substrate-side electrode 131 via an electrode support post 319.

In the address electrode 66 constructed as described above, the elevated electrode 318 is a first address electrode 661 that generates an electrostatic force between the first address electrode 661 and the mirror 50. When a first address voltage is supplied to the substrate-side electrode 131 on the substrate 1, the first address voltage is supplied from the substrate-side electrode 131 to the first address electrode 661 via the electrode support post 319. The substrate-side electrode 132 is a second address electrode 662 that generates an electrostatic force between the second address electrode 662 and the mirror 50 at a position spaced farther away from the first axis La than the first address electrode 661. A second address voltage is supplied from the substrate 1 to the second address electrode 662. The substrate-side electrode 131 and the substrate-side electrode 132 are separated from each other, and hence the first address electrode 661 and the second address electrode 662 are driven independently of each other. More specifically, when the mirror 50 is driven in the direction CWa about the first axis La as illustrated in FIG. 13, the first address voltage to be supplied to the first address electrode 661 and the second address voltage to be supplied to the second address electrode 662 may be set different from each other and may be switched at different timings.

Referring to FIG. 11 and FIG. 12 again, similarly to the address electrode 66, the address electrode 67 arranged on a side with respect to the second axis Lb includes, on the surface is of the substrate 1, a substrate-side electrode 141 arranged on the side of the second axis Lb in plan view, and a substrate-side electrode 142 arranged on the opposite side of the second axis Lb with respect to the substrate-side electrode 141. The substrate-side electrode 141 and the substrate-side electrode 142 are separated from each other. Further, the address electrode 67 includes an elevated electrode 328 spaced away from both of the substrate 1 and the mirror 50. The elevated electrode 328 is supported on the substrate-side electrode 141 via an electrode support post 329.

In the address electrode 67 constructed as described above, the elevated electrode 328 is a first address electrode 671 that generates an electrostatic force between the first address electrode 671 and the mirror 50. When a first address voltage is supplied to the substrate-side electrode 141 on the substrate 1, the first address voltage is supplied from the substrate-side electrode 141 to the first address electrode 671 via the electrode support post 329. The substrate-side electrode 142 is a second address electrode 672 that generates an electrostatic force between the second address electrode 672 and the mirror 50 at a position spaced farther away from the second axis Lb than the first address electrode 671. A second address voltage is supplied from the substrate 1 to the second address electrode 672. The substrate-side electrode 141 and the substrate-side electrode 142 are separated from each other, and hence the first address electrode 671 and the second address electrode 672 are driven independently of each other. More specifically, when the mirror 50 is driven in the direction CCWb about the second axis Lb as illustrated in FIG. 13, the first address voltage to be supplied to the first address electrode 671 and the second address voltage to be supplied to the second address electrode 672 may be set different from each other and may be switched at different timings.

According to the electro-optical device 100 constructed as described above, the voltages supplied to the address electrodes 66 and 67 and the timings to switch the voltages can be combined with each other more appropriately. Therefore, the direction of the electrostatic force to be generated between the mirror 50 and each of the address electrodes 66 and 67 and the magnitude of the electrostatic force in each direction can be made appropriate, thereby being capable of, for example, suppressing the wobbling when the posture of the mirror 50 is switched, that is, stably switching the posture of the mirror 50. Accordingly, the occurrence of light leaking or the like is suppressed.

Fourth Embodiment

In the third embodiment, similarly to the second embodiment, the address electrode 66 may include a third address electrode provided between the first address electrode 661 and the second address electrode 662, and the address electrode 67 may include a third address electrode provided between the first address electrode 671 and the second address electrode 672.

The entire disclosure of Japanese Patent Application No. 2016-102175, filed May 23, 2016 is expressly incorporated by reference herein.

What is claimed is:

1. An electro-optical device, comprising:
a substrate;
a mirror being positioned above a surface of the substrate and modulating light;
a torsion hinge being positioned between the mirror and the substrate, and supporting the mirror via a mirror support post such that the mirror is pivotable about an axis;
a bias electrode being positioned between the torsion hinge and the substrate, and supplying a bias voltage to the mirror via the torsion hinge; and
an address electrode being positioned on a side of the axis in plan view between the mirror and the substrate, and supplying an electrostatic force between the address electrode and the mirror to pivot about the axis,
wherein the address electrode includes:
a first address electrode that is positioned on a side of the axis in plan view; and
a second address electrode that is positioned on a same side of the axis with respect to the first address electrode in plan view, the first address electrode and the second address electrode are positioned apart from each other in plan view, and the second address electrode is driven independently of the first address electrode.

2. The electro-optical device according to claim 1, wherein the second address electrode is a substrate-side electrode that is provided on the surface of the substrate.

3. The electro-optical device according to claim 1, wherein the first address electrode is an elevated electrode that is provided at a position spaced away from the substrate.

4. The electro-optical device according to claim 1, wherein timings to switch voltages supplied to the first address electrode and the second address electrode are different from each other in at least one driving period.

5. The electro-optical device according to claim 1, wherein voltages supplied to the first address electrode and the second address electrode are different from each other in at least one driving period.

6. The electro-optical device according to claim 5, wherein, in the at least one driving period, a voltage difference between the second address electrode and the mirror is smaller than a voltage difference between the first address electrode and the mirror.

7. The electro-optical device according to claim 1, wherein the address electrode further includes a third address electrode that is provided between the first address electrode and the second address electrode in plan view, and wherein the first address electrode, the second address electrode, and the third address electrode are driven independently of each other.

8. The electro-optical device according to claim 7, wherein the third address electrode is a lower-stage elevated electrode that is provided at a position spaced away from the substrate, and wherein the first address electrode is an upper-stage elevated electrode that is provided at a position spaced away from the substrate on a side closer to the mirror than the third address electrode.

9. The electro-optical device according to claim 1, wherein the address electrode is provided on each side across the axis in plan view.

10. The electro-optical device according to claim 1, wherein the torsion hinge supports the mirror such that the mirror is pivotable about a first axis as the axis and a second axis intersecting the first axis, and wherein the address electrode is provided on each of one side of the first axis and one side of the second axis in plan view.

11. An electronic device, comprising:
the electro-optical device according to claim 1;
a light source unit that radiates light onto the mirror; and
a projection optical system that projects modulated light output from the electro-optical device.

* * * * *